United States Patent
Coney et al.

(10) Patent No.: US 8,589,648 B2
(45) Date of Patent: Nov. 19, 2013

(54) PERFORMING A COPY OPERATION ON A REPLICATED VIRTUAL CARTRIDGE

(75) Inventors: Daniel Philip Coney, Bristol (GB); Andrew Damian Topham, Dursley Gloucestershire (GB); Alastair Slater, Chepstow Monmouthshire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 13/177,693

(22) Filed: Jul. 7, 2011

(65) Prior Publication Data
US 2013/0013845 A1 Jan. 10, 2013

(51) Int. Cl.
*G06F 12/00* (2006.01)
(52) U.S. Cl.
USPC ............................ 711/162; 711/112; 711/173
(58) Field of Classification Search
USPC .......................................... 711/162, 112, 173
See application file for complete search history.

(56) References Cited

U.S. PATENT DOCUMENTS

| | | | |
|---|---|---|---|
| 2004/0034811 A1* | 2/2004 | Trimmer et al. | 714/13 |
| 2004/0181628 A1 | 9/2004 | Trimmer et al. | |
| 2005/0080992 A1 | 4/2005 | Massey et al. | |
| 2006/0013078 A1 | 1/2006 | Goodman et al. | |
| 2006/0200623 A1* | 9/2006 | Gonzalez et al. | 711/111 |
| 2007/0255920 A1* | 11/2007 | Gold | 711/170 |
| 2008/0222344 A1 | 9/2008 | Upadhyayula | |
| 2009/0077309 A1* | 3/2009 | Slater et al. | 711/111 |

OTHER PUBLICATIONS

Webpage, "Virtual Data Recovery (VDR)," http://www.opentechsystems.com/vdr.php, 2 pages.
Lingfang Zeng et al., "Hybrid RAID-Tape-Library Storage System for Backup," Proceedings of the Second International Conference on Embedded Softward and Systems (ICESS'05) Dec. 16-18, 2005.

* cited by examiner

*Primary Examiner* — Reginald Bragdon
*Assistant Examiner* — Gurtej Bansal

(57) ABSTRACT

A replicated virtual cartridge is received into a media vault of a first virtual tape library and appears in a shadow library. The virtual cartridge is visible to a backup application via the shadow library to allow the backup application to perform a copy operation on the virtual cartridge.

18 Claims, 4 Drawing Sheets

PERFORMING A COPY OPERATION ON A REPLICATED VIRTUAL CARTRIDGE

BACKGROUND

A typical computer network may have a backup and recovery system for purposes of restoring data (one or multiple files, for example) on the network to a prior state should the data become corrupted, be overwritten, subject to an attack from a virus, etc. Traditionally, the backup and recovery system may include physical magnetic tape drives that store backup data on magnetic tapes. After a transfer of backup data to a given magnetic tape, the tape may be removed from its tape drive and stored in a secure location, such as in a fireproof safe.

The backup and recovery system may alternatively be a virtual tape library (VTL)-based system that emulates but replaces the physical magnetic tape drive system. With a VTL-based system, virtual cartridges, instead of magnetic tapes, store the backup data. The virtual cartridges may be communicated to a remote appliance, where the cartridges are stored and possibly retrieved for future backup operations.

DETAILED DESCRIPTION

Figure 1:
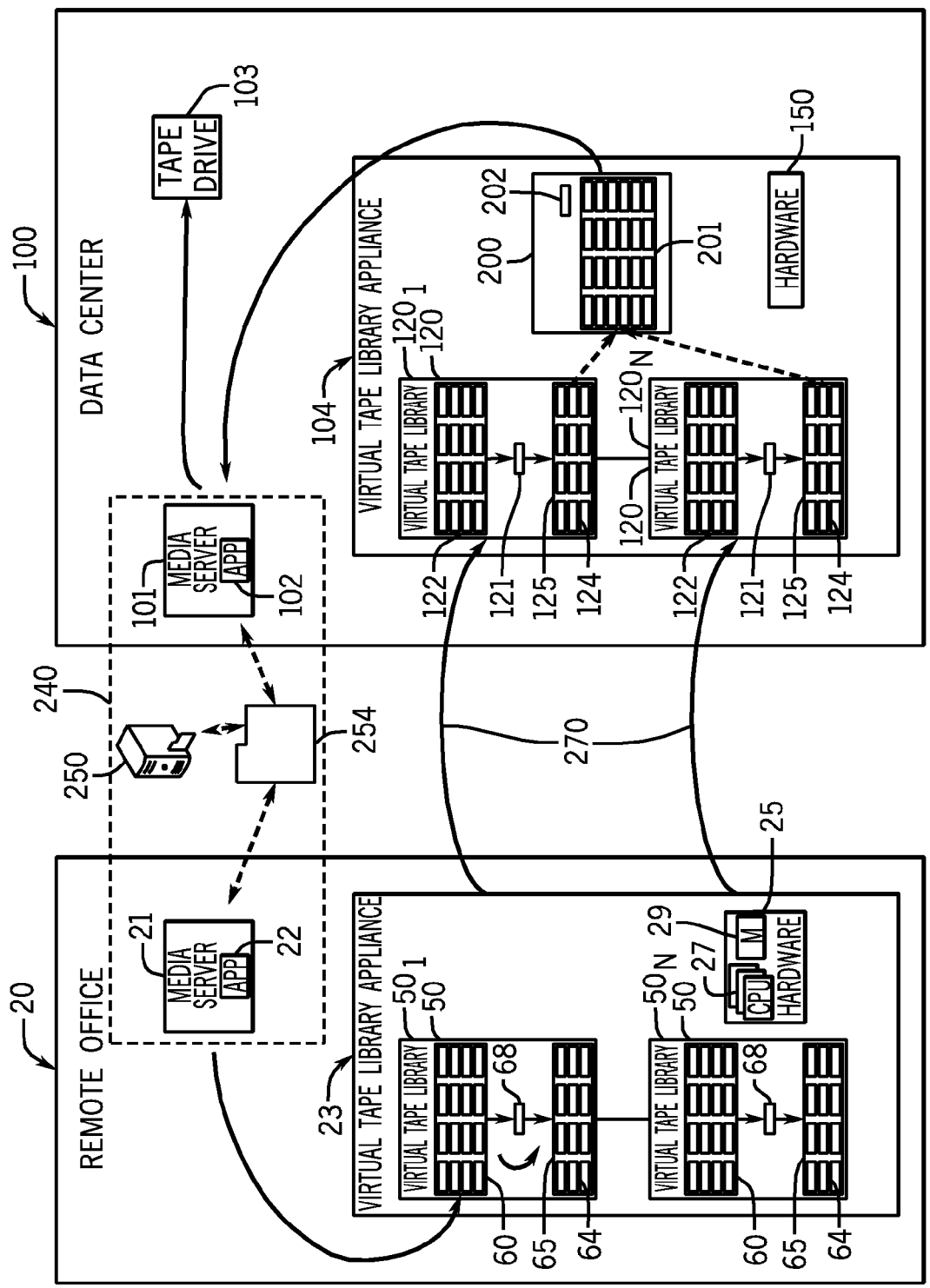
FIG. 1 is a schematic diagram of a computer network according to an example implementation.

Referring to FIG. 1, a computer network includes one or multiple remote offices 20 (one remote office 20 being depicted in FIG. 1 as a non-limiting example). Each remote office 20 contains a primary backup virtual tape appliance 23, which stores backup data that is created at the remote office 20. In this manner, in accordance with implementations described herein, the remote office 20 contains a backup media server (called the "media server 21" herein), which executes machine executable instructions to form a backup application 22 that stores backup data in the primary backup virtual tape appliance 23.

More specifically, the primary backup virtual tape appliance 23 contains one or multiple virtual tape libraries 50 (virtual tape libraries $50_1 \ldots 50_N$, being depicted in FIG. 1 as non-limiting examples in FIG. 1). Each virtual tape library 50 emulates a physical tape drive interface and presents cartridge slots 60 to the media server 21. The cartridge slots 60 emulate the cartridge slots that would be present in a physical tape library. Each cartridge slot 60 is associated with a unit of data called a "virtual cartridge." Each virtual library 50 includes a virtual tape drive (not shown), which emulates a physical tape drive within a physical tape library, and the virtual tape drive can write to any virtual tape cartridge in the virtual library. As depicted in FIG. 1, a given virtual tape library 50 may also contain cartridge slots 64 of a media vault 65 and a virtual mail slot 68 for purposes of moving virtual cartridges into and out of the virtual tape library 50. In general, virtual cartridges contained in the cartridge slots 60 are visible to the backup application 22, whereas virtual cartridges contained in the cartridge slots 64 of the media vault 65 are invisible to the backup application 22.

In general, the media server 21 may contain one or multiple central processing units (CPUs) that execute machine executable instructions to form the backup application 22. Likewise, the primary backup virtual tape appliance 23 may contain hardware 25 (one or multiple central processing units (CPUs) 27, for example) that executes instructions stored in memory 29 (a non-transitory memory, such as semiconductor storage, optical storage, magnetic storage, etc) for purposes of performing various functions of the appliance 23, as described herein.

During a backup operation at the remote office 20, the backup application 22 stores data in one or multiple virtual tape libraries 50 in the form of one or more virtual cartridges, which are also referred to as "primary virtual cartridges" herein. The backup application 22 assigns a unique identifier, or "barcode," to each primary virtual cartridge when created, and this barcode is used to track the virtual cartridge within the network. In this manner, the backup application 22 performs backups to the primary backup virtual tape appliance 23 and communicates with a backup master server (herein called the "master server 250") to update a database 254 to identify the virtual cartridge barcodes on which the backup session is stored. The database 254 serves as a catalog to track the virtual cartridges on the primary backup virtual tape appliance 23.

For purposes of storing replicated copies of the primary virtual cartridges, which are called "replicated virtual cartridges" herein, the network includes a replication target virtual tape appliance 104 at a remote data center 100. In this manner, the one or more remote offices 20 may be in communication with the data center 100 via one or multiple types of network fabric (i.e., wide area network (WAN) connections, wireless connections, Internet connections, etc.), and the replication target virtual tape appliance 104 stores replicated versions of virtual cartridges that were created at the various remote offices 20.

In accordance with some implementations, the replication target virtual tape appliance 104 contains virtual tape libraries 120 (virtual tape libraries $120_1 \ldots 120_N$, being depicted in FIG. 1 as non-limiting examples), which each virtual tape library 120 being a mirror image of an associated virtual tape library 50 of the primary backup virtual tape appliance 23 due to replication mappings 270. In this manner, due a replication mapping 270, virtual cartridges that appear in the cartridge slots 60 and 64 in a given virtual tape library 50 are automatically mapped to corresponding cartridge slots of the associated virtual tape library 120: cartridge slots 122, which are "visible" cartridge slots of the library 120; and cartridge slots 124 of a media vault 125 of the library 120. Moreover, when one of the virtual cartridges is moved into the mail slot 68 of a given virtual tape library 50, the virtual cartridge appears in a mail slot 121 of the associated virtual tape library 120. Similar to the primary backup virtual tape appliance 23, the replication target virtual tape appliance 104 may contain hardware 150 (one or multiple central processing units (CPUs), for example) that executes instructions stored in a non-transitory memory for purposes of performing various functions of the appliance 104, as described herein.

The data center 100 also contains a media backup server (herein called the "media server 101") that contains one or multiple central processing units (CPUs) that execute machine executable instructions to form a backup application 102 for the data center 100. In general, the backup application 102 may be used for such purposes as recovery operations should one or more of the primary virtual cartridges stored at a remote office 20 need to be replaced. As depicted in FIG. 1, the master server 250 as well as the media servers 21 and 101 are with the same application domain 240, as either media server 21, 101 may access the database 254 to determine the location of a given virtual cartridge.

For such purposes of an additional layer of backup security, it may be desirable to use the backup application 102 at the data center 100 to copy a given replicated virtual cartridge (stored in the replication target virtual tape appliance 104) to generate a physical cartridge that is stored on physical media, such as, for example, a physical cartridge that is stored on a tape that is inserted into a tape drive 103 of the data center 100. In this manner, the tape drive 103 may be coupled to the media server 101 through an appropriate interface, such as a parallel SCSI, SAS or Fibre Channel interface. Once created, the physical cartridge is assigned a new barcode, and details about the physical cartridge are stored in the database 254 to permit tracking of the physical cartridge.

Using the backup application 102 to perform a backup operation, such as the above-described copying, however, may be quite challenging (if not for the techniques and systems that are disclosed herein) for the following reasons. The media server 101 is in the same domain 240 as the media server 21, and both of these entities share the database 254. Therefore, if the barcode of the replicated virtual cartridge is presented to the backup application 102 for purposes of performing a backup application, the backup application would perceive the virtual cartridge as appearing in two places: in one of the virtual tape libraries 50, as a primary virtual cartridge stored in the primary backup virtual tape appliance 23; and in one of the virtual tape libraries 120, as a replicated virtual cartridge stored in the target virtual tape appliance 104. In other words, the same barcode is assigned to both of these virtual cartridges. As a non-limiting example, when presented with the same virtual cartridge at two places simultaneously, the backup application 102 may determine that an error has occurred and mark the corresponding barcode (and corresponding virtual cartridges) as being invalid.

However, systems and techniques are disclosed herein for purposes of temporarily hiding the primary virtual cartridge from the backup application 102, which permits the backup application 102 to process the replicated virtual cartridge in a backup operation, such as an operation to copy the replicated virtual cartridge to produce a corresponding, new physical cartridge that is assigned a new barcode.

Figure 2:
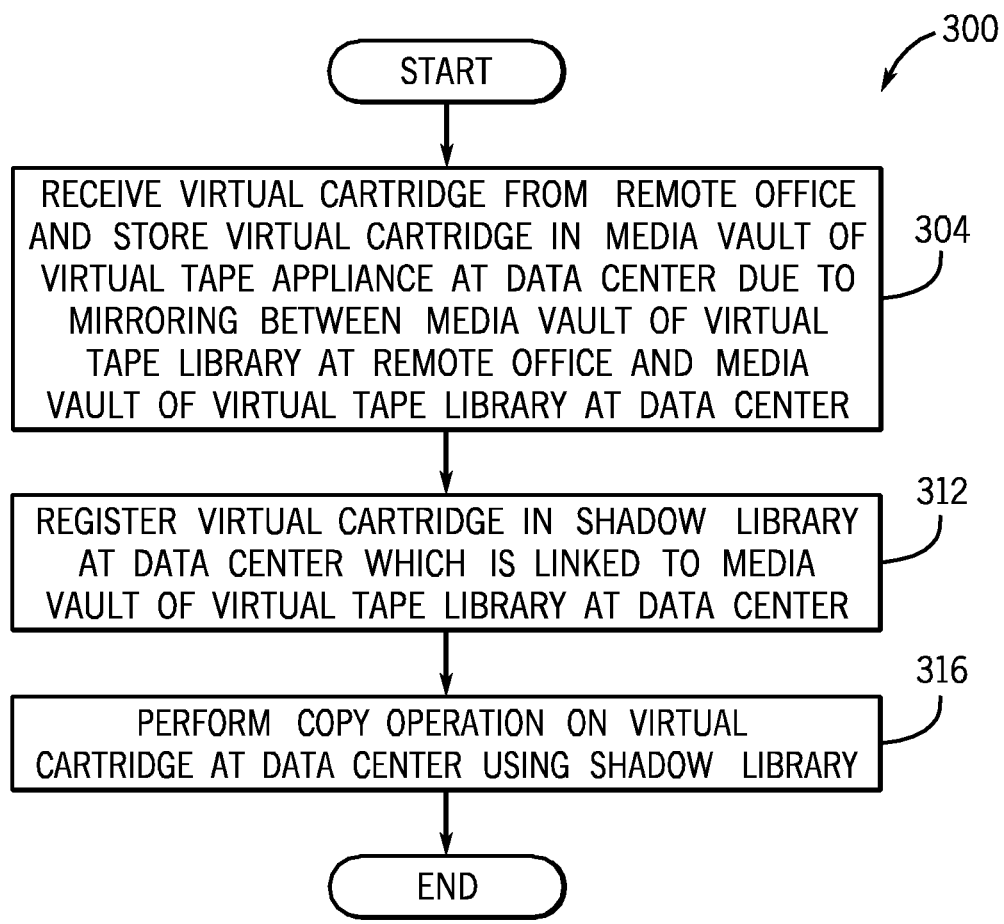
FIGS. 2, 3A and 3B are flow diagrams depicting techniques to copy a virtual cartridge to physical media according to example implementations.

Referring to FIG. 2 in conjunction with FIG. 1, in accordance with example implementations, a technique 300 is performed to allow the backup application 102 to perform a copy operation on a replicated virtual cartridge. Pursuant to the technique 300, a replicated virtual cartridge is received from a remote office 20 and is stored in a media vault of a virtual tape library at the data center 100 due to the mirroring between the virtual tape libraries of the remote office 20 and data center 100, pursuant to block 304. In this manner, after creating a given new primary virtual cartridge, the backup application 22 sends a command to the primary backup virtual tape library appliance 23 to move the primary virtual cartridge from one of the cartridge slots 60 to a mail slot 68. Upon doing so, the primary virtual cartridge immediately moves into one of the cartridge slots 64 of the media vault 65 and becomes invisible to the backup applications 22 and 102. Due to the replication mapping 270, the corresponding replicated virtual cartridge at the data center 100 moves into one of the cartridge slots 124 of one of the media vaults 125. Thus, at this point, the replicated and virtual cartridges are not visible to the backup application 102.

The technique 300 subsequently involves registering (block 312) the replicated virtual cartridge in a shadow virtual tape library (called the "shadow library 200" herein) of the target virtual tape library appliance 104, which is created for purposes of presenting the replicated virtual cartridge to the backup application 102. In accordance with some implementations, the shadow library 200 is configured to be a read only library. In some implementations, the movement of the replicated virtual cartridge to the shadow library may be a manual process that is initiated via a graphical user interface (GUI), or management interface, of the target virtual tape library appliance 104. However, in other applications, the target virtual tape library appliance 104 may apply a predetermined rule such that whenever a replicated virtual cartridge is seen in a media vault, the replicated virtual cartridge is automatically presented to the shadow library 200.

Unlike the other libraries, the shadow library 200 does not contain a media vault, and the replicated virtual cartridges may not actually be transferred into the library 200. In this manner, in accordance with some implementations, the shadow library 200 may contain cartridge slots 200 to present virtual cartridges that are mapped to the cartridge slots 124 of the media vaults 125. Moreover, in accordance with some implementations, the backup application 102 may communicate an inventory/scan command to the shadow library 200 for purposes of detecting a new cartridge in the library 200.

Thus, due to the above-described mapping and shadow library 200, the backup application 102 perceives the primary virtual cartridge as moving from a remote office 20 to the shadow library 200 at the data center 100 as though the virtual cartridge physically moved between these two locations. The backup application 102 may then perform a copy operation on the virtual cartridge (such as the migration of the replicated virtual cartridge data to produce a physical cartridge, for example) using the shadow library 200, as depicted in block 316 of FIG. 2.

Figure 3A:
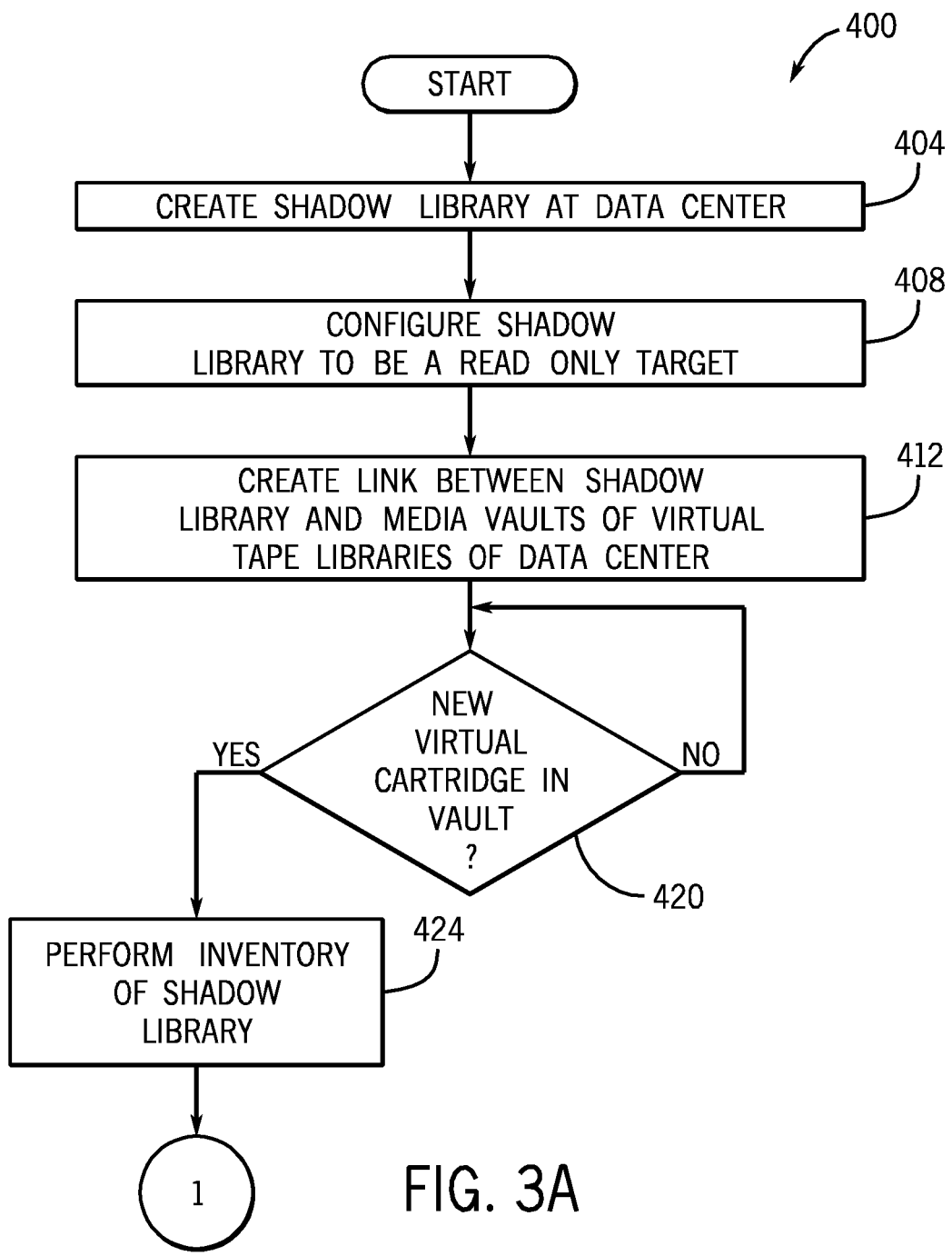
Figure 3B:
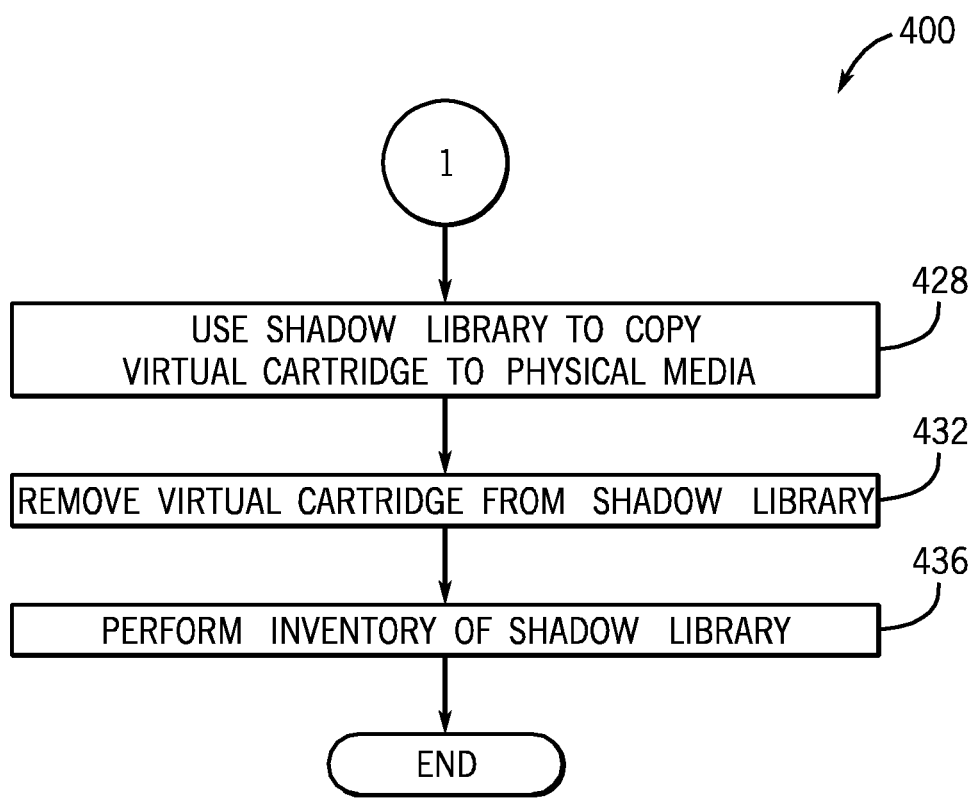

As a more specific example, a virtual cartridge may be copied onto physical media using the backup application 102, pursuant to a technique 400 that is depicted in FIGS. 3A and 3B. Referring to FIG. 3A in conjunction with FIG. 1, the technique 400 includes using the replication target virtual tape appliance 104 to create a shadow library 200 at the data center 100, pursuant to block 404 and configuring (block 408) the shadow library 200 to be a read only target. The technique 400 further includes using the replication target virtual tape appliance 104 to create (block 412) a link, or a mapping, between the shadow library 200 and the media vaults of the virtual libraries 120 of the appliance 104.

When a backup occurs at a remote office 20 and the newly created one or multiple primary virtual cartridges are moved into the media vaults of the primary backup virtual tape appliance 23, the media vaults of the replication target virtual tape appliance 104 receive the corresponding one or multiple replicated virtual cartridges due to the mapping 270. In accordance with some implementations, the backup application 102 determines (diamond 420) whether a virtual cartridge to be copied onto physical media has been transferred into the media vault 206. This determination may involve, for example, the backup application 102 performing (block 424) an inventory of the shadow library 200. Referring to FIG. 3B in conjunction with FIG. 1, the backup application 102 may then use the shadow library 200 to copy the replicated virtual cartridge to physical media, pursuant to block 428.

Upon completion of the copy operation, a user of the virtual tape library appliance 104 (via a corresponding user interface) or an automatic rule employed by the replication target virtual tape appliance 104 (depending on the implementation) moves the virtual cartridge from the shadow library 200 to a mail slot 202 of the shadow library 200 to remove the virtual cartridge from being presented by the shadow library, pursuant to block 432. This move removes the virtual cartridge from shadow library 200 so that the cartridge may be moved into a cartridge slot 60 on the primary backup virtual tape appliance 23. In accordance with some implementations, the backup application of the data center 100 may perform (block 436) another inventory of the shadow library 200 to ensure that the backup application 102 does not see the recently copied virtual cartridge in two places simultaneously.

While example embodiments have been described herein, those skilled in the art, having the benefit of this disclosure, will appreciate numerous modifications and variations therefrom. It is intended that the appended claims cover all such modifications and variations.

What is claimed is:

1. A method comprising:
    receiving a replicated virtual cartridge in a media vault of a first virtual tape library disposed at a first site due to a replication mapping between the first virtual tape library and a second virtual tape library disposed at a second site;
    associating the replicated virtual cartridge with a shadow library to cause the replicated virtual cartridge to be visible to a backup application; and
    using the backup application to access the virtual cartridge via the shadow library to perform a copy operation on the virtual cartridge, wherein:
        the first virtual tape library comprises a mirrored version of the second virtual tape library due to the replication mapping,
        a primary virtual cartridge is created on the second virtual tape library to cause the replicated virtual cartridge to appear in the first virtual tape library due to the replication mapping, and
        the replicated virtual cartridge is received into the media vault of the first virtual tape library due to the primary virtual cartridge being moved into a media vault of the second virtual tape library and the replication mapping.

2. The method of claim 1, wherein the replicated virtual cartridge is associated with a first identifier and the act of using the backup application comprises copying the replicated virtual cartridge to create a physical cartridge and assigning a second identifier to the physical media.

3. The method of claim 1, further comprising configuring the shadow library as a read only target.

4. The method of claim 1, further comprising creating a replication mapping between the media vault and the first virtual tape library to cause the content of the media vault to appear in the shadow library.

5. The method of claim 1, wherein the first virtual tape library and the shadow library are associated with a first virtual tape appliance and the second virtual tape library is associated with a second virtual tape appliance.

6. The method of claim 5, wherein the act of using the backup application comprises using a backup server coupled to the first virtual tape appliance.

7. An article comprising a non-transitory storage medium readable by at least one processor to store instructions that when executed by said at least one processor cause said at least one processor to:
    cause a replicated virtual cartridge received into a media vault of a first virtual tape library to appear in a shadow library, the replicated virtual cartridge being visible to a backup application via the shadow library to allow the backup application to perform a copy operation on the replicated virtual cartridge; and
    remove the replicated virtual cartridge from the library shadow after the copy operation, wherein:
        the first virtual tape library receives the replicated virtual cartridge due to a replication mapping between the first virtual tape library and a second virtual tape library,
        the replicated virtual cartridge is a replicate of another virtual cartridge stored in the second virtual tape library, and
        the replicated virtual cartridge is received into the media vault of the first virtual tape library due to the other virtual cartridge being moved into a media vault of the second virtual tape library and the replication mapping.

8. The article of claim 7, the storage medium storing instructions that when executed by said at least one processor cause said at least one processor to perform an inventory of the shadow library to cause the replicated virtual cartridge to appear in the shadow library.

9. The article of claim 7, the storage medium storing instructions that when executed by said at least one processor cause said at least one processor to perform an inventory of the shadow library to remove the replicated virtual cartridge from the shadow library.

10. The article of claim 7, wherein the shadow library is configured to be a read only target library.

11. The article of claim 7, wherein the first virtual tape library and the shadow library are associated with a first virtual tape appliance and the second virtual tape library is associated with a second virtual tape appliance located remotely from the first virtual tape appliance.

12. The article of claim 7, the storage medium storing instructions that when executed by said at least one processor cause said at least one processor to move the virtual cartridge to a mail slot of the shadow library to remove the virtual cartridge from the shadow library.

13. A computer system comprising:
    a backup server comprising a backup application;
    a first virtual tape library comprising a media vault to receive a replicated virtual cartridge due to a replication mapping between the first virtual tape library and a second virtual tape library disposed remotely with respect to the first virtual tape library; and
    a shadow library being mapped to the media vault to present the replicated virtual cartridge to a backup application to allow the backup application to perform a copy operation on the replicated virtual cartridge, the replicated virtual cartridge being otherwise hidden from the backup application, wherein:
        the first virtual tape library comprises a mirrored version of the second virtual tape library due to the replication mapping,
        a primary virtual cartridge is created on the second virtual tape library to cause the replicated virtual cartridge to appear in the first virtual tape library due to the replication mapping, and
        the replicated virtual cartridge is received into the media vault of the first virtual tape library due to the original virtual cartridge being moved into a media vault of the second virtual tape library and the replication mapping.

14. The computer system of claim 13, wherein the shadow library is configured as a read only target.

15. The computer system of claim 13, further comprising another replication mapping between the media vault and the first virtual tape library to cause the content of the media vault to appear in the shadow library.

16. The computer system of claim 13, wherein the first and second virtual tape libraries are part of virtual tape appliances disposed remotely with respect to each other.

17. The computer system of claim 13, wherein the virtual cartridge is associated with a first identifier and the backup application is adapted to copy the virtual cartridge to create a physical cartridge, the physical cartridge being assigned a second identifier.

18. The computer system of claim 17, further comprising a tape drive to store the physical cartridge.

* * * * *